W. P. SAVAGE.
IMPACT REGISTER.
APPLICATION FILED OCT. 18, 1913.
1,125,731. Patented Jan. 19, 1915.
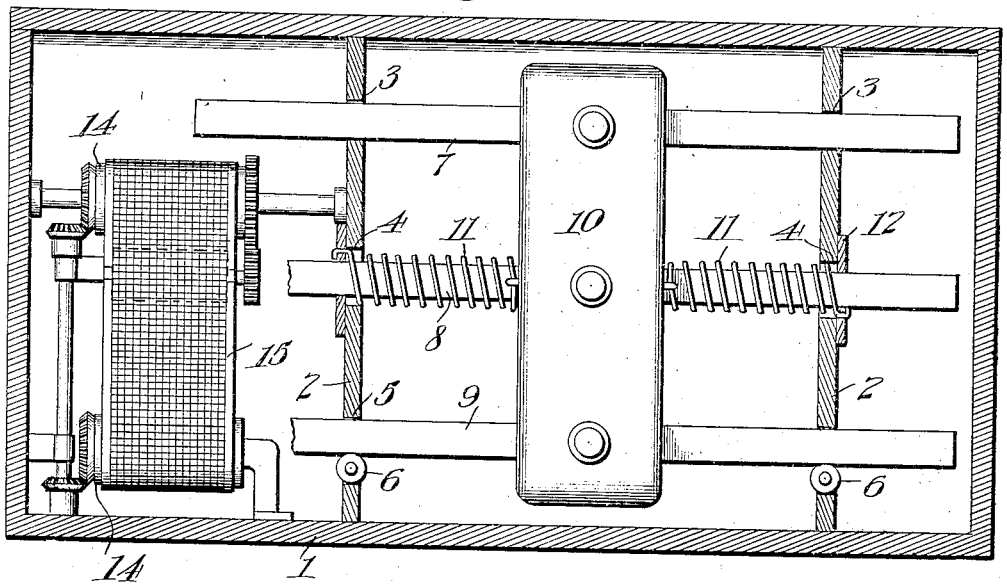
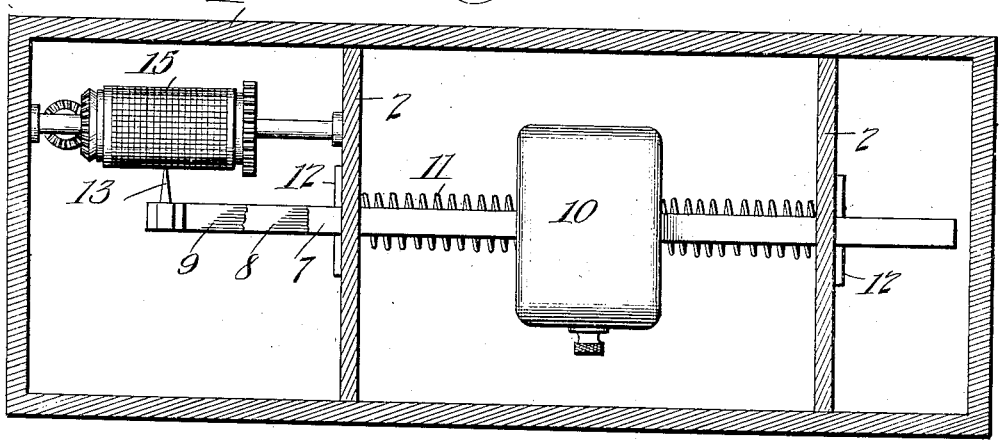
Witnesses:
C. F. Miller Jr.
Eva W. Springer.
Inventor:
William P. Savage
By T. Lloyd Marchalee
Attorney

UNITED STATES PATENT OFFICE

WILLIAM P. SAVAGE, OF BELLEVILLE, ILLINOIS.

IMPACT-REGISTER.

1,125,731.  Specification of Letters Patent.  Patented Jan. 19, 1915.

Application filed October 18, 1913. Serial No. 795,826.

*To all whom it may concern:*

Be it known that I, WILLIAM P. SAVAGE, a citizen of the United States, residing at Belleville, in the county of St. Clair and State of Illinois, have invented certain new and useful Improvements in Impact-Registers, of which the following is a specification.

This invention relates to impact registers and it consists in the novel features hereinafter described and claimed.

An object of the invention is to provide a register of simple and durable structure adapted to be positioned upon a car or moving vehicle and which is adapted to indicate and show the force of impact which is extended or exerted when the cars are brought together during the operation of coupling the same or at other times.

This device will record the rough handling of cars in transit and is of value to the railroad in determining where cars are handled roughly and also in the settlement of claims for broken freight in interroad movement. Heretofore the management of roads were at a loss to know where freight was handled roughly and by what conductors such handling was done, with the present invention they can tell the time of such rough handling, the weight or force of the impact and if necessary the name of the conductor in charge of the car when it received the rough handling. This is determined by the register on the chart which shows the time and indicates the force of the impact in pounds.

With the above objects in view the register includes a casing adapted to be mounted upon the wall of a car and which is provided with rollers having a chart wound upon the same. Any suitable means may be provided for rotating the rollers and in fact the said rollers may be rotated simultaneously by a clock or other spring mechanism. Partitions are arranged in the casing and bars are movably mounted transversely through the partitions. The said bars are three in number two of them being guide bars and the other being a bar which carries a needle adapted to move over the chart as the said chart is wound upon one roller and unwound from the other. A weight is mounted upon the said bars and springs are attached at their inner ends to the weight and pass through the partition and are provided at their outer ends with stops which normally lie against the outer surface of the partition. The lowermost bar of the set of bars is supported upon friction rollers which are journaled in the partition.

In the accompanying drawing:—Figure 1 is a top plan view of the register with the top of the casing removed and the partitions in section. Fig. 2 is a side elevation with part of the casing removed, and Fig. 3 is a detail view of the recording strip and pencil.

The register comprises a casing 1 having parallel partitions 2 located therein. The partitions 2 are provided with alined openings 3, 4 and 5. Rollers 6 are journaled for rotation at the lower edges of the openings 5. Bars 7, 8 and 9 are slidably mounted in the openings 3, 4 and 5 respectively and a weight 10 is mounted upon the intermediate portion of the bars 7, 8 and 9 between the partitions 2. The bars 9 rest upon the upper portions of the peripheries of the rollers 6 and sustain the weight of the body 10 and the bars 7 and 8. Coiled springs 11 are fixed at their inner ends to the opposite sides of the weight 10 and receive the opposite end portions of the bar 8. The outer end portions of the springs 11 pass through the partitions 2 and are provided with caps or stops 12 which normally bear against the outer surfaces of the partitions 2. The bar 7 is merely a guide bar to hold the parts in proper relation with respect to each other. The bar 9 sustains the weight of the parts hereinbefore indicated while the bar 8 carries at one end a pencil or needle 13. The tension of the springs 11 is such that the weight 10 is normally held approximately midway between the partitions 2.

Beyond the outerside of one of the partitions 2 and within the casing 1 are journaled rollers 14 and any suitable means may be provided for simultaneously rotating the rollers 14 in the same direction. A chart 15 is wound upon the rollers 14 and may be provided with any suitable lines or graduations and the pencil 13 normally rests against the chart 15 at a point approximately midway between the opposite edges thereof.

In operation the rollers 14 are caused to rotate simultaneously in the direction as above indicated whereby the chart 15 is unwound from one roller and wound upon the other at a predetermined rate of speed. This rotating of the rollers may be in accord with a timing mechanism as for instance as a clock or any suitable means may be provided for rotating the rollers. As the car or vehicle to which the casing 1 is applied comes in contact with another car or vehicle during the operation of coupling the same the shock incident to bringing the car to a sudden stop by striking an object at rest causes the weight 10 to move from its normal position approximately midway between the partitions 2 toward one of the said partitions and away from the other partition. Consequently that spring 11 which is provided with the stop 12 bearing against the partition away from which the weight 10 moves is elongated and at the same time the rods 7, 8 and 9 are moved longitudinally through the partitions 2. The movement of the rod 9 causes the needle or pencil 13 to move transversely of the chart 15 and consequently the said pencil makes marks on the said chart which indicate in pounds the force of the impact or jolt. In view of the fact that the chart is moving longitudinally and the needle moves transversely of the same it is an easy matter to determine subsequently just exactly where said jolt or jar took place and if the jar was violent and damage resulted to the goods upon the car the crew having charge of the car may be held responsible.

After one of the springs 11 has been elongated as above described and the jar ceases the said spring contracts to its normal length and at the same time the other spring together with its stop 12 will prevent the weight 10 from vibrating between the partitions and will bring the weight 10 to a prompt stop at its normal position between the partitions 2. This is due to the fact that the inner ends of the springs 11 are fixed to the opposite sides of the weight and the said springs pass through the partitions 2 and are provided at their outer ends with the stops 12 which normally bear against the outer surface of the said partitions. Therefore it will be seen that an impact register of simple structure is provided and that the parts mutually coöperate with each other to accurately determine the force of impact and the chart may be subsequently read to place the blame or responsibility for damage done as a result of careless handling of cars or rolling stock.

Having described the invention what is claimed is:—

1. An impact register comprising a record strip, a supply drum and a receiving drum positively geared together, a plurality of horizontally movable spring balanced rods, and a weight connecting all of said rods.

2. An impact register comprising a frame, a plurality of horizontally movable spring balanced rods supported in said frame, a weight connecting all of said rods, and a recording strip acted upon by a pencil carried by one of said rods.

3. An impact register comprising a frame, a plurality of horizontally movable spring balanced rods supported in said frame, a weight connecting all of said rods, stops carried by said rods for limiting their movements, anti-friction rollers supporting one of said rods so as to sustain the weight, and a recording sheet adapted to be acted upon by a pencil carried by one of said rods.

4. An impact register comprising a plurality of horizontally movable spring balanced rods arranged one above the other, a weight connecting all of said rods, anti-friction rollers engaging the lowermost rod, a pencil carried by one of said rods and engaging a sheet mounted for movement transversely of said rods.

5. An impact register comprising a frame, a plurality of rods freely mounted in said frame, a weight carried by said rods, springs mounted upon each side of said weight to normally retain the weight and rods in a stationary position, and a recording strip acted upon by a pencil carried by one of said rods.

In testimony whereof I affix my signature in presence of two witnesses.

WILLIAM P. SAVAGE.

Witnesses:
OTTO R. ROCK,
FRED. W. KUHN.